Patented Sept. 6, 1932

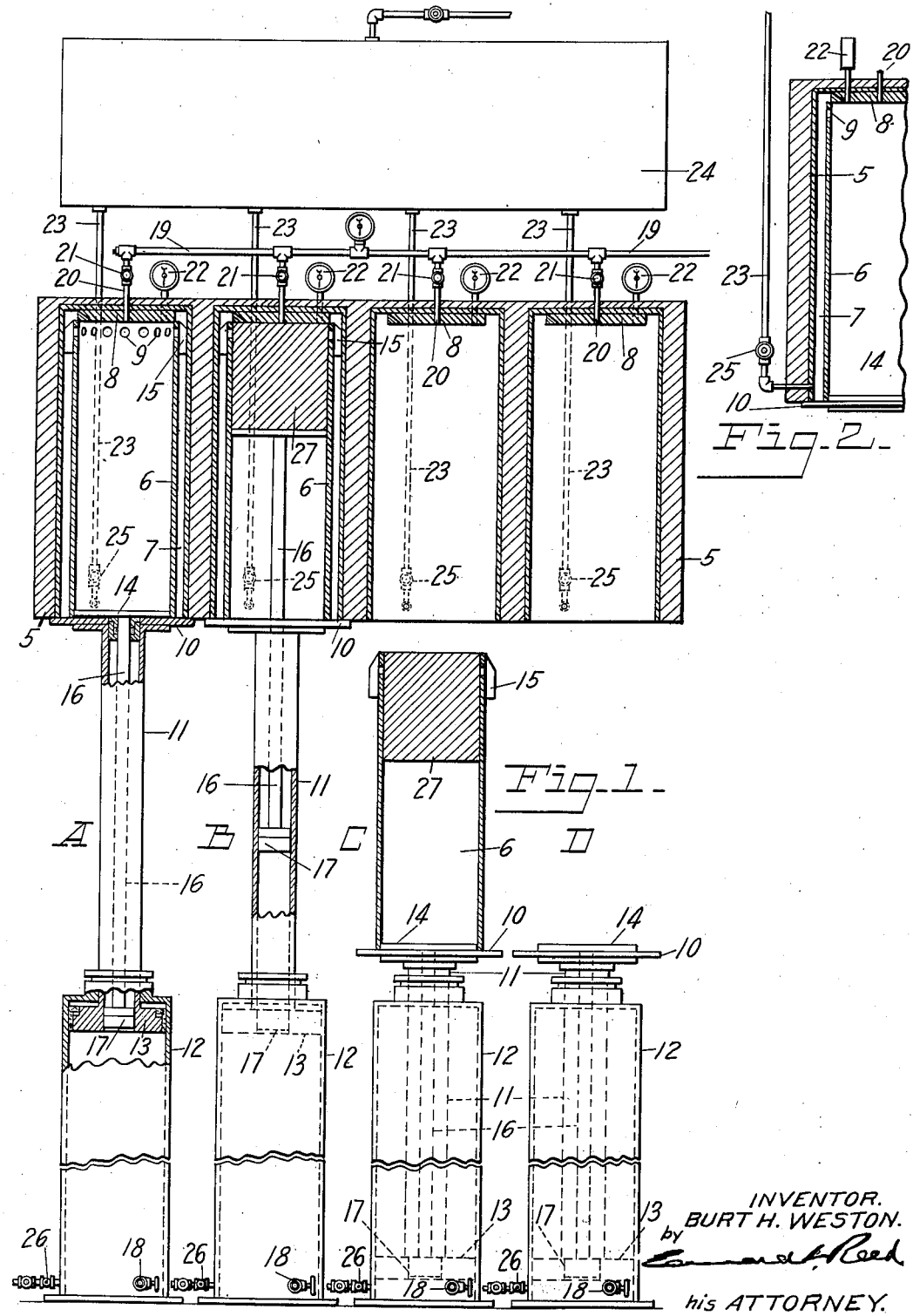

1,876,266

UNITED STATES PATENT OFFICE

BURT H. WESTON, OF WOOD RIVER, ILLINOIS

APPARATUS FOR PRODUCING CAKES OF SOLID CARBON DIOXIDE

Application filed March 20, 1929. Serial No. 348,635.

This invention relates to a method and apparatus for producing cakes of solid carbon dioxide.

One object of the invention is to provide a method whereby hard and non-porous cakes of carbon dioxide may be produced quickly and economically.

A further object of the invention is to provide a method whereby a cake of solid carbon dioxide may be produced without the carbon dioxide coming in contact with the atmosphere at any time during the production of the cake.

A further object of the invention is to provide an apparatus for producing a cake of solid carbon dioxide which will prevent the atmosphere from contacting with the carbon dioxide prior to the removal of the finished cake from the apparatus.

A further object of the invention is to provide an apparatus having means for freezing the carbon dioxide snow before it is compressed into a cake form.

A further object of the invention is to provide an apparatus which will produce a very hard non-porous cake of carbon dioxide.

A further object of the invention is to provide such an apparatus which will be simple in its construction and operation and which will require but a short time to produce a finished cake of carbon dioxide.

Other objects of the invention will appear as the method and apparatus is described in detail.

In the accompanying drawing Fig. 1 is a front view, partly in section and partly in elevation, of an apparatus embodying my invention; and Fig. 2 is a sectional view of portions of the casing and mold.

In the drawing I have illustrated one form of apparatus for carrying out my method of producing cakes of solid carbon dioxide but it will be understood that this particular apparatus has been chosen for the purpose of illustration only and that the apparatus may take various forms without departing from the spirit of the invention.

In producing a cake of solid carbon dioxide in accordance with my invention I first introduce liquid carbon dioxide under high pressure into a closed chamber where it is expanded and thereby converted into a snow-like substance, commonly known as carbon dioxide snow. The carbon dioxide snow thus formed is subjected to extremely low temperatures so that the snow is frozen hard, this preferably being accomplished by conducting that part of the carbon dioxide vapor which is not converted into snow about the exterior of the chamber in which the snow is formed. When the chamber has been filled with snow and the snow frozen, which requires but a very short space of time, the snow is subjected to high pressure, in the chamber where it was produced, and is thereby formed into a hard non-porous cake. The chamber in which the carbon dioxide snow is formed and pressed into a cake is closed to exclude atmospheric air at all times during the cycle of operations, thus preventing the atmosphere from coming into contact with the carbon dioxide, which, particularly when in the form of snow, evaporates rapidly when in contact with the atmosphere. When the carbon dioxide has been compressed into cake form it is removed from the chamber and is ready for the market or for such use as it may be desired to make of the same.

The apparatus for producing the cake of carbon dioxide in accordance with my method may take various forms and in that particular apparatus here illustrated I have shown a series or battery of cake forming units, each of which is complete in itself and may be operated independently of the other units. By providing a battery of cake forming units I secure an added economy both in the apparatus and in the time required for operation. The several cake forming units of the parts are shown in the positions which they occupy at different stages of the cycle of operations. The several units are marked respectively A, B, C and D.

Each cake forming unit comprises a casing 5 which constitutes a freezing chamber and which is adapted to receive an inner receptacle or mold 6 which constitutes the chamber in which the carbon dioxide snow is produced and pressed into cake form. As here shown, the casing 5 is cylindrical in form and is closed at its sides and top but is open at its bottom to permit the insertion and removal of the mold. The mold also is shown as cylindrical in form and is open at both ends. Preferably it is formed of steel tubing to enable it to withstand the high pressures to which it is subjected and the inner surface is finished to facilitate the removal of the cake which is formed therein. The mold is of a diameter somewhat less than the internal diameter of the casing 5 so as to provide between the mold and the casing a space or passage 7. When the mold is in proper position within the casing the upper end thereof is closed, this being preferably accomplished by providing the top wall of the casing 5 with a depending portion or plate 8 which registers with the upper end of the mold. The interior of the mold is in communication with the space 7 through a series of openings 9 formed near the upper end thereof. The mold is supported by a movable structure 10 which serves not only to support the mold and move the same into the casing 5 but also serves to close the opening in the bottom of the casing 5, it being here shown as a plate of sufficient diameter to overlap and engage the lower edge of the casing. This supporting structure or plate 10 is, in the present instance carried by a tubular piston rod 11 which extends into a fluid pressure cylinder 12 and is connected with a piston 13 mounted in that cylinder. A plunger is mounted on and carried by the supporting structure 10 and comprises a disklike part or head 14 which normally rests upon the supporting structure 10 and is of such a diameter that it will fit within the lower end of the mold, thus centering the mold with relation to the casing. If desired, the mold may be provided at its upper end with lugs 15 to properly position the same with relation to the casing. It will be apparent that by changing the diameter of the head 14 of the plunger molds of different diameters may be utilized. The plunger further comprises a rod 16 which is secured to the head 14 and extends downwardly through the tubular piston rod 11 and is provided at its lower end with a piston 17, the head 14 and piston 13 having openings in line with the tubular rod 11 to permit the passage of the rod 16 and piston 17, respectively. When the head 14 is in contact with the supporting structure 10 the piston 17 is preferably substantially flush with the piston 13.

At the beginning of the cycle of operations the supporting structure 10 and the pressure head 14 are in their lowermost positions, as shown in unit D, in which positions they are spaced from the casing 5 a distance sufficient to permit the mold 6 to be placed in position thereon. When the mold is in position fluid under pressure is admitted to the cylinder 12, through a pressure line controlled by a valve 18. The pressure acts upon both the piston 13 and the piston 17 and the supporting structure 10 and pressure head 14 are moved upwardly, thus inserting the mold in the casing and moving the supporting structure 10 against the bottom of the casing to close the same. Sufficient pressure is maintained in the cylinder 12 to retain the parts in this position without moving the piston 14 with relation to the mold. With the parts in this position, which is shown in unit A, liquid carbon dioxide under high pressure is introduced into the mold, where it is expanded and converted partially or entirely into carbon dioxide snow. The liquid carbon dioxide may be introduced into the mold in any suitable manner and, in the present instance, I have provided a main supply line 19 leading from a suitable source of liquid carbon dioxide, under pressure, not here shown, and connected by branch pipes 20 with the molds of the respective units. As here shown, each branch pipe 20 extends through the top wall and plate 8 of its unit so that when the mold is in position, as shown in unit A, the branch pipe will open into that mold. Each branch pipe is controlled by a valve 21, preferably of the type known as an expansion valve, which controls the admission of the liquid carbon dioxide to the mold and causes the same to form vapor as it enters the mold, which vapor is, in a large part, instantly converted into carbon dioxide snow. This snow accumulates in the mold until the latter is filled, this being indicated by the dropping pressure shown by the gage 22 which communicates with the interior of the mold. Usually a part of the carbon dioxide vapor in the mold is not converted into snow and this vapor will escape from the mold through the openings 9 into the space or passageway 7 surrounding the mold. The carbon dioxide vapor has an extremely low temperature and will cause the snow within the mold to be frozen very hard. The space or passageway 7 is connected by means of an outlet pipe 23 with an expansion or recovery tank 24 and the vapor is eventually delivered to the tank 24 and may be subsequently liquefied and again introduced in the mold. The pipe 23 preferably communicates with the space or passageway 7 near the bottom thereof and a valve 25 is interposed in the pipe some distance above the bottom of the casing, to control the escape of the carbon dioxide vapor from the passageway 7. This valve is so adjusted as to retard the escape of the vapor from the passageway and cause it to be confined therein in such quantity and for such a period of time as may be necessary to properly freeze the carbon dioxide snow. However, the freezing takes place very rapidly and the snow will be frozen hard almost as soon as the mold is filled. The mold having been filled with frozen snow additional pressure is introduced into the fluid pressure cylinder 12 to actuate the piston 17 and force the pressure head 14 upwardly, thereby compressing the frozen snow in the mold and forming the same into a very hard block which is substantially non-porous and which will therefore evaporate very slowly. The compression of the cake having been completed the valve 18 is closed and an exhaust valve 26 opened to permit the escape of the pressure fluid from the cylinder 12, thereby enabling the supporting structure 10, the mold and the pressure head 14, and their connected parts, to move downwardly by gravity, the parts assuming the positions shown in unit C. A brief exposure to the atmosphere will loosen the compressed cake of carbon dioxide, which is shown at 27, from the mold and permit of its ready removal therefrom. The cake is then ready for use or for the market and may be protected from exposure to the atmosphere in the usual or any suitable manner. The complete cycle of operations requires only a short space of time and when the finished cake has been removed the cycle may be repeated.

While I have described my preferred method for producing cakes of solid carbon dioxide and have shown and described one form of apparatus for carrying out that method, I do not wish to be limited to the exact details of either the method or the apparatus as various modifications may occur to a person skilled in the art.

Having now fully described my invention, what I claim as new and desire to secure by Letters Patent, is:

1. In an apparatus for producing solid carbon dioxide, a casing having one end open, a mold adapted to be inserted in said casing, means for supporting said mold in said casing and closing the open end of said casing, said mold being of less diameter than said casing to provide a space between said parts, said mold having an opening to connect the interior thereof with said space, means for introducing liquid carbon dioxide under pressure into said mold and causing the same to expand and form carbon dioxide snow, and means for compressing said snow in said mold while said mold is supported within said casing.

2. In an apparatus for producing solid carbon dioxide, a casing having its lower end open, a mold adapted to be inserted in said casing, a movable structure to support said mold and to close said open end of said casing when said mold is properly positioned in said casing, means to actuate said movable structure, and means to introduce liquid carbon dioxide under pressure into said mold to cause the same expand to form carbon dioxide snow.

3. In an apparatus for producing solid carbon dioxide, a casing having its lower end open, a mold adapted to be inserted in said casing, a movable structure to support said mold and to close said open end of said casing when said mold is properly positioned in said casing, means to actuate said movable structure, means to introduce liquid carbon dioxide under pressure into said mold to cause the same to expand to form carbon dioxide snow, a plunger having a part extending through said movable structure and having a part to engage said carbon dioxide snow in said mold and compress the same, and means to actuate said plunger.

4. In an apparatus for producing solid carbon dioxide, a casing having its lower end open, a mold adapted to be inserted in said casing, a movable structure to support said mold and to close said open end of said casing when said mold is properly positioned in said casing, a tubular member connected with said movable structure to actuate the same, a plunger having a part to extend into said mold, and having another part to extend through said tubular member, means to actuate said movable structure and said plunger in unison to position said mold in said casing and to close the open end of said casing, and to then actuate said plunger with relation to said movable structure to cause said part thereof to move lengthwise of said mold, and means to introduce liquid carbon dioxide under pressure into said mold and causing the same to expand to form carbon dioxide snow.

5. In an apparatus for producing solid carbon dioxide, a casing having one end open, a mold adapted to be inserted in said casing, means to introduce liquid carbon dioxide under pressure into said mold when the latter is properly positioned in said casing and to cause said carbon dioxide to expand and form carbon dioxide snow, a fluid pressure cylinder, a piston in said cylinder, a tubular rod for said piston, a head carried by said tubular rod to support said mold and close the open end of said casing, said head and said piston having openings therethrough in line with said tubular rod, a second piston mounted to operate in said tubular rod, a rod connected with said second piston and extending through said tubular rod, a head carried by the last mentioned rod and adapted to enter said mold, and means for admitting fluid under pressure to said cylinder.

6. In an apparatus for producing solid carbon dioxide, a casing having one end open, a mold adapted to be inserted in said casing, a movable structure to support said mold and to close the open end of said casing, a plunger normally supported by and movable with relation to said movable structure and having a part to enter said mold, said mold being of a diameter less than the diameter of said casing to provide a space between said parts and having an opening to connect the interior thereof with said space, means to actuate said movable structure to insert said mold in said casing and to close the open end of said casing, means to introduce liquid carbon dioxide under pressure into said mold when the latter is properly positioned in said casing and to cause said carbon dioxide to expand and form carbon dioxide snow, and means for actuating said plunger to compress said carbon dioxide snow in said mold.

7. In an apparatus for producing solid carbon dioxide, a casing, a mold supported within said casing, arranged to provide a space between the same and said casing and having an opening to connect the interior of said mold with said space, means for introducing liquid carbon dioxide under pressure into said mold and causing the same to expand and form carbon dioxide snow, means for compressing said snow in said mold, an expansion tank, a conduit connecting the space between said mold and said casing with said expansion tank, and a valve in said conduit.

8. In an apparatus of the character described, a plurality of freezing tanks, a plurality of molds, means for moving said molds into and supporting the same within the respective freezing tanks, each mold being so arranged within its tank as to provide a passageway about the same and having an opening to connect the interior thereof with said passageway, a supply pipe for liquid carbon dioxide under pressure, means for connecting said supply pipe with each of said molds, valves to separately control said connections, a valve controlled outlet leading from the passageway about said mold, separate plungers mounted to operate in the respective molds and separately controlled means for actuating said plungers.

9. In an apparatus for producing solid carbon dioxide, a structure having a chamber provided at one end with an opening and having its other end closed, a plunger normally closing said opening, means for introducing liquid carbon dioxide under pressure into said chamber and causing the same to expand as it enters said chamber and form carbon dioxide snow, and means for actuating said plunger to compress said carbon dioxide snow within said chamber.

10. In an apparatus for producing solid carbon dioxide, a mold having an opening at one end thereof, means for introducing carbon dioxide under pressure into said mold near the other end thereof and causing the same to expand as it enters said mold to form carbon dioxide snow, a plunger extending into said mold through said opening and operable therein to compress carbon dioxide snow, and means for actuating said plunger.

11. In an apparatus for producing solid carbon dioxide, a mold having one end closed and its other end open, means for introducing carbon dioxide under pressure into said mold near the closed end thereof and causing the same to expand as it enters said mold to form carbon dioxide snow, means for subjecting said mold to a low temperature to harden said snow, and a plunger extending into said mold through the open end thereof and operable therein to compress the snow into a cake.

12. In an apparatus for producing solid carbon dioxide, a mold, means for introducing carbon dioxide under pressure into said mold and causing the same to expand therein to form carbon dioxide snow, means for conducting about the exterior of said mold a portion of the carbon dioxide which is not converted into snow to lower the temperature within said mold and harden said snow, and means for compressing the snow in said mold to form a cake.

13. In an apparatus for producing solid carbon dioxide, a mold having its upper end closed, a plunger operable within said mold and supported normally near the lower end thereof, means for vaporizing liquid carbon dioxide in said mold above said plunger to form carbon dioxide snow, said mold having an opening through which that portion of said carbon dioxide vapor which is not converted into snow may escape, means forming a passageway about the exterior of said mold, said passageway communicating with said opening, and means for actuating said plunger to compress the carbon dioxide snow in said mold.

14. In an apparatus for producing solid carbon dioxide, a casing, a mold supported within said casing, and arranged to provide a space between the same and said casing, means for introducing liquid carbon dioxide under pressure into said mold and causing the same to expand and form carbon dioxide snow, said mold having an opening to conduct the unsolidified carbon dioxde gas into said space, and said space being provided with a restricted outlet to confine said gas therein, and means for compressing said snow in said mold.

In testimony whereof, I affix my signature hereto.

BURT H. WESTON.